United States Patent
Sugihara (10) Patent No.: US 6,751,433 B2
(45) Date of Patent: Jun. 15, 2004

(54) DEVELOPING DEVICE AND IMAGE FORMING APPARATUS USING THE SAME

(75) Inventor: Kazuyuki Sugihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/268,790

(22) Filed: Oct. 11, 2002

(65) Prior Publication Data

US 2003/0072591 A1 Apr. 17, 2003

(30) Foreign Application Priority Data

Oct. 12, 2001 (JP) ........................................ 2001-314792

(51) Int. Cl.[7] .............................................. G03G 15/09
(52) U.S. Cl. ....................... 399/267; 399/275; 399/277
(58) Field of Search ................................ 399/264, 267, 399/272, 273, 274, 275, 276, 284, 277

(56) References Cited

U.S. PATENT DOCUMENTS

| | | |
|---|---|---|
| 5,552,877 A | 9/1996 | Ishikawa et al. |
| 5,617,198 A | 4/1997 | Ishikawa et al. |
| 5,646,721 A | 7/1997 | Sugihara et al. |
| 5,657,115 A | 8/1997 | Sugihara |
| 5,671,470 A | 9/1997 | Maruta et al. |
| 5,758,235 A | 5/1998 | Kosuge et al. |
| 5,761,576 A | 6/1998 | Sugihara et al. |
| 5,765,059 A | 6/1998 | Kosuge et al. |
| 5,768,664 A | 6/1998 | Kosuge et al. |
| 5,787,328 A | 7/1998 | Sugihara et al. |
| 5,826,146 A | 10/1998 | Maruta et al. |
| 5,850,586 A | 12/1998 | Sugihara et al. |
| 5,940,664 A | 8/1999 | Sugihara et al. |
| 5,956,549 A | 9/1999 | Sugihara et al. |
| 5,991,569 A | 11/1999 | Sugihara et al. |
| 6,070,037 A | 5/2000 | Sugihara et al. |
| 6,072,967 A | 6/2000 | Sugihara et al. |
| 6,081,684 A * | 6/2000 | Naganuma et al. ......... 399/275 |
| 6,104,900 A | 8/2000 | Ishikawa et al. |
| 6,122,469 A | 9/2000 | Miura et al. |
| 6,141,520 A | 10/2000 | Kosuge |
| 6,226,481 B1 | 5/2001 | Yoneda et al. |
| 6,336,020 B1 | 1/2002 | Ishikawa et al. |

FOREIGN PATENT DOCUMENTS

| | | |
|---|---|---|
| JP | 62-138860 | 6/1987 |
| JP | 5-6103 | 1/1993 |
| JP | 10-39620 | 2/1998 |
| JP | 11-338259 | 12/1999 |

* cited by examiner

*Primary Examiner*—Hoang Ngo
(74) *Attorney, Agent, or Firm*—Oblon, Spivak, McClelland, Maier & Neustadt, P.C.

(57) ABSTRACT

A developing device for an image forming apparatus of the present invention includes a developing roller made up of a sleeve and a magnet roller and a doctor facing the surface of the sleeve. The edge of the doctor faces the sleeve at a particular position selected to stabilize the amount of a developer to be scooped up, protect the developer from deterioration, and allow an adequate amount of charge to deposit on the developer by friction.

5 Claims, 8 Drawing Sheets

DEVELOPING DEVICE AND IMAGE FORMING APPARATUS USING THE SAME

BACKGROUND OF THE INVENTION

1. Field of the Invention

The present invention relates to a developing device for developing a latent image formed on an image carrier with a developer and a printer, facsimile apparatus, copier or similar electrophotographic image forming apparatus using the same.

2. Description of the Background Art

One of conventional developing devices for use in electrophotographic image forming apparatuses is configured to cause a developer, which is a toner and magnetic grain mixture, to magnetically deposit on a developer carrier in the form of a magnet brush. The magnet brush is brought into contact with a latent image formed on an image carrier in movement, thereby developing the latent image with toner. This type of developing device is taught in, e.g., Japanese Patent Laid-Open Publication Nos. 5-40406, 7-72739, 8-137255, 10-20664, 10-232561, 11-38761, and 11-338259.

In the developing device of the type described, the developer carrier is made up of a sleeve and a magnet roller fixed in place inside the sleeve. The magnet roller is provided with a magnetic pole for exerting a magnetic force in the directions normal to and tangential to the sleeve, so that the developer is retained on and conveyed by the sleeve. A doctor or metering member faces the surface of the sleeve in order to regulate the amount of the developer deposited on the sleeve. The normal magnetic force mainly serves to retain the developer at the position of the magnetic pole while the tangential magnetic force mainly serves to convey the developer along the surface of the sleeve. A developer staying portion is formed upstream of the doctor in the direction of developer conveyance for promoting the frictional charging of the developer, so that the developer can rise on the sleeve in the form of a magnet brush or brush chains.

While various schemes have heretofore been proposed for implementing dot reproducibility high enough to insure high image quality, it is well known that reducing the grain size of the magnetic grain of the developer, among others, is effective.

To achieve high image quality. With an image forming apparatus using the developing device of the type described, it is necessary to stabilize the amount of the developer scooped up, to protect the developer from deterioration, and to make the amount of charge to deposit on the developer adequate. The amount of the developer scooped up refers to an amount in which the developer passes a gap between the sleeve and the doctor. The magnetic force distribution of the magnet roller, as measured on the surface of the sleeve facing the doctor, contributes a great deal to achievement of the above objects.

More specifically, if the tangential magnetic force on the sleeve surface facing the doctor is excessively small, then the conveying ability of the sleeve is noticeably effected by the wear of the sleeve surface and that of the developer surface, causing the amount of the developer scooped up to noticeably vary. Also, the normal magnetic force on the sleeve surface is excessively greater than the tangential magnetic force on the sleeve surface, increasing the amount of the developer to be retained on the sleeve. As a result, excessive friction acts between the grains of the developer and deteriorates the developer (so-called toner spent), preventing image quality from being enhanced despite the use of magnetic grains of small grain size.

On the other hand, if the tangential magnetic force of the magnetic pole facing the doctor is greater than the normal magnetic force of the same pole, then the tangential magnetic force improves the conveying ability of the sleeve for thereby reducing the variation of the amount of the developer scooped up ascribable to the surface configurations stated above. It has been proposed to cause the doctor to face the portion of the sleeve surface where the normal tangential force is smallest in order to enhance the conveying ability. This kind of scheme, however, reduces the amount of the developer to be retained on the sleeve and therefore friction to act between the developer grains, causing the background of an image to be contaminated and degrading the ability to follow a solid image. Particularly, a developing device for a color image forming apparatus tends to consume much toner because color images include more solid images than conventional monochromatic images. It is therefore difficult to deposit a desired amount of charge on a great amount of toner. A short amount of charge on toner is apt to bring about background contamination, fog and other image defects.

A magnetic member may be positioned on the metering member of the magnet brush type developing device, as also proposed in the past. The magnetic member causes the magnetic grains to chain in a doctor gap between it and the sleeve surface in the form of a curtain by exerting a restraining force, so that the toner grains passing through the curtain are additionally charged on contacting the magnetic grains. However, if the restraining force of the magnetic member is excessively great, then excessive stress acts on the magnetic grains and sleeve and is apt to cause their surfaces to wear. Consequently, frictional resistance on the surface of the sleeve and the surfaces of the magnetic grains is reduced and causes the magnetic grains and sleeve to slip on each other, thereby critically lowering the conveying ability of the sleeve and the amount of the developer scooped up. The resulting images suffer from granularity or halftone irregularity. On the other hand, if the restraining force of the magnetic member is short, then the magnetic grains fail to form the curtain and cannot promote the charging of the toner grains at all.

Technologies relating to the present invention are also disclosed in, e.g., Japanese Patent Laid-Open Publication Nos. 62-138860, 5-6103, and 10-39620.

SUMMARY OF THE INVENTION

It is an object of the present invention to provide a developing device capable of stabilizing the amount of a developer to be scooped up, protecting the developer from deterioration and making the frictional charge of the developer adequate to thereby insure stable, high image quality, and an image forming apparatus using the same.

It is another object of the present invention to provide a developing device capable of making the magnetic restraining force of a magnetic member positioned on a metering member adequate, and an image forming apparatus using the same.

A developing device of the present invention includes a developer carrier for conveying a developer, which consists of toner and magnetic grains, deposited thereon to a developing position where the developer carrier faces an image carrier. A magnetic field forming member is fixed in place inside the developer carrier for exerting a normal magnetic force and a tangential magnetic force. A metering member faces the surface of the developer carrier with the intermediary of a gap for regulating the amount of the developer being conveyed by the developer carrier toward the developing position. Assume a normal flux density distribution range corresponding to, among normal flux densities Bmy of normal magnetic forces that can be measured on the surface of the developer carrier, a single maximum flux density max (Bmy). Then, the metering member is positioned such that its edge faces, within the above normal flux density distribution range, a portion of the developer carrier satisfying the following conditions (1) through (3):

(1) the normal flux density Bmy is at least one-half of the normal maximum flux density max (Bmy);

(2) the tangential flux density distribution range flux density Bmx, which can be measured on the surface of the developer carrier, located downstream of a portion of the developer carrier where the tangential flux density [[Bmy]] Bmx is maximum in the direction of developer conveyance; and (3) the normal flux density distribution Bmy is equal to or higher than the tangential flux density Bmx.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
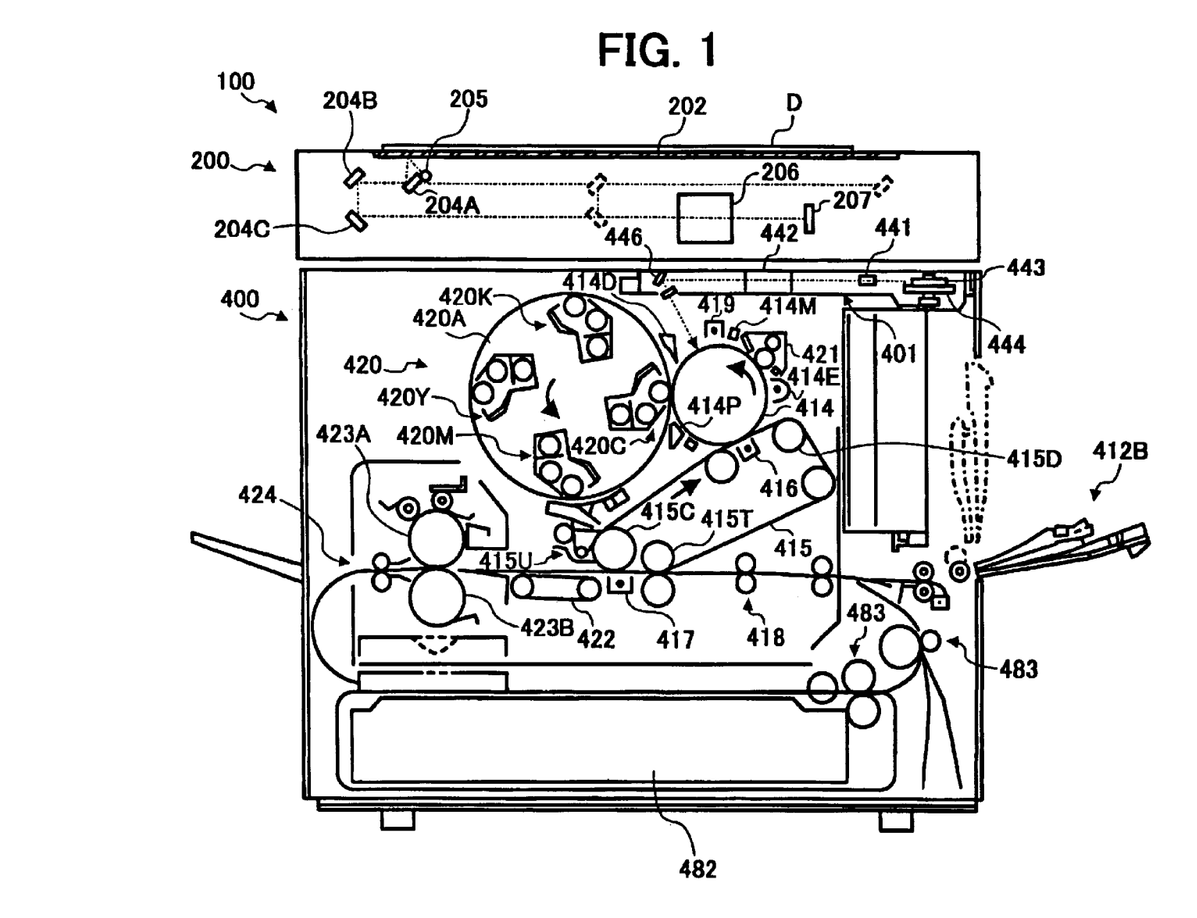
FIG. 1 is a view showing an image forming apparatus embodying the present invention.

Referring to FIG. 1 of the drawings, an image forming apparatus embodying the present invention is shown and generally designated by the reference numeral 100. As shown, the image forming apparatus 100 is generally made up of a scanner or color image reading section 200 and a printer or color image recording section 400. The scanner 200 illuminates a document D laid on a glass platen 202 with a lamp 205. The resulting reflection from the document D representative of color image information is focused on a color sensor 207 via mirrors 204A, 204B and 204C and a lens 206. The color sensor 207 reads the separated color components of the color image information, e.g., a blue (B), a green (G) and a red (R) color component and transforms them to corresponding electric image signals.

More specifically, in the illustrative embodiment, the color sensor 207 includes B, G and R separating means and a CCD (Charge Coupled Device) image sensor or similar photoelectric transducer and reads the three different colors at the same time. An image processing section, not shown, converts the B, G and R electric signals to color image data made up of black (BK) data, magenta (M) data, cyan (C) data and yellow (Y) data. At this instant, the lamp 205 and mirrors 204A through 204C are moved to the left, as viewed in FIG. 1, in response to a scanner start signal synchronous to the operation of the printer 400 while reading the document D. By repeatedly reading the document D four times, the scanner 200 sequentially produces image data of four different colors. The printer 400 forms a toner image with the image data of each color while superposing such toner images to thereby produce a full-color image.

The printer 400 includes an optical writing unit or latent image forming means 401, a photoconductive drum or image carrier 414, and a revolver type developing device or developing means (revolver hereinafter) 420. The optical writing unit 401 transforms the color image data output from the scanner 200 to an optical signal and scans the drum 414 with the optical signal, thereby forming a latent image on the drum 414. For this purpose, the optical writing unit 401 includes a laser or laser beam emitting means 441, a laser driver, not shown, a polygonal mirror 443, a mirror motor 444 for causing the polygonal mirror 443 to rotate, an fθ lens 442, and a mirror or reflector 446.

The drum 414 is rotatable counterclockwise, as indicated by an arrow in FIG. 1. Arranged around the drum 414 are a drum cleaning unit 421, a quenching lamp 414M, a charger or charging means 419, a potential sensor 414D responsive to the potential of the latent image formed on the drum 414, one of developing sections arranged in the revolver 420, a density pattern sensor 414P, and an intermediate image transfer belt or intermediate image transfer body (belt hereinafter) 415.

Figure 2:
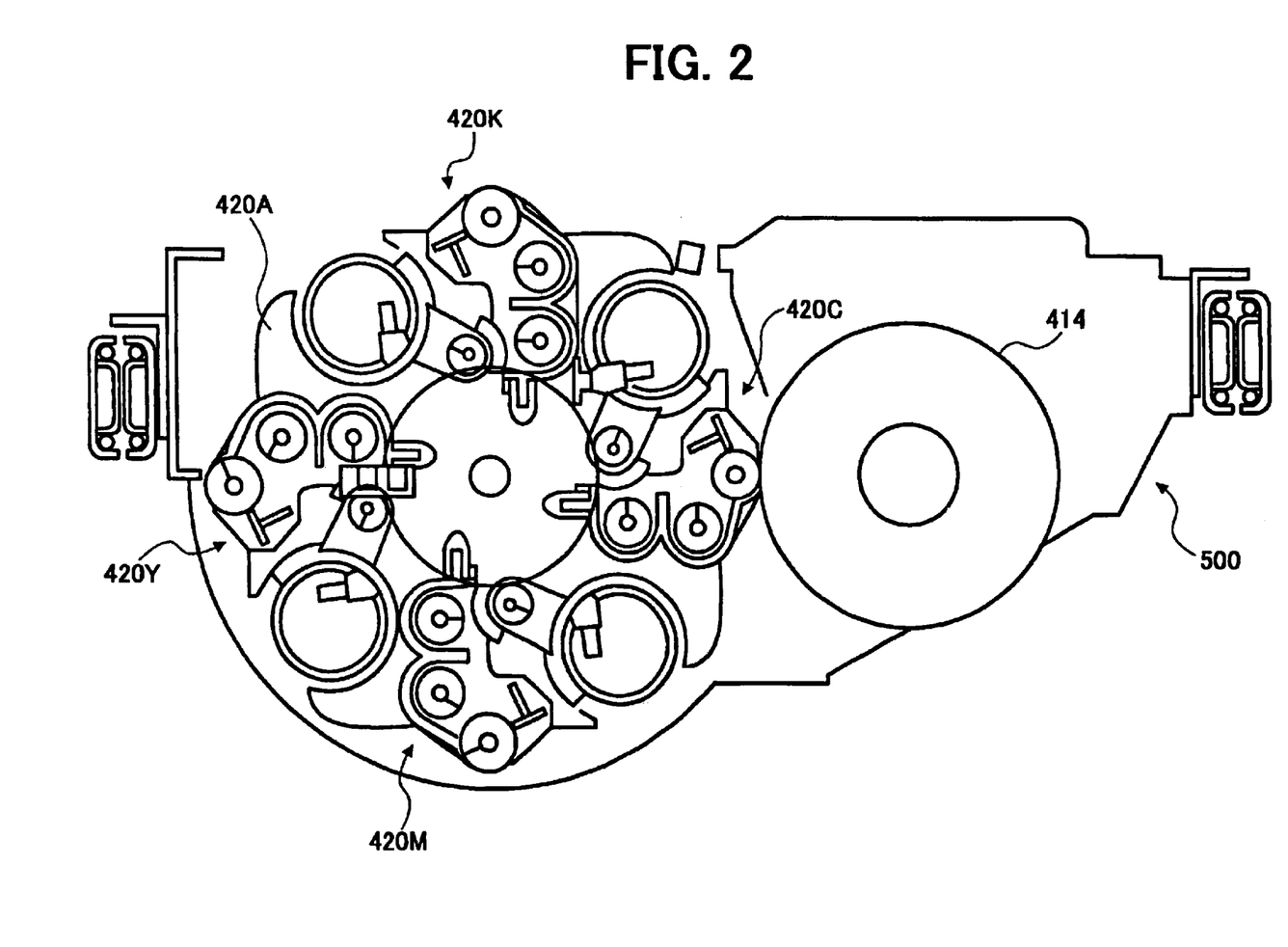
FIG. 2 is a view showing a drawer unit included in the illustrative embodiment.

As shown in FIG. 2, the revolver 420 includes BK developing section 420K, a C developing section 420C, an M developing section 420M and a Y developing section, which are supported by a support 420A. A revolver driver, not shown, causes the support 420A to rotate counterclockwise, as indicated by an arrow in FIG. 1.

When the revolver 420 is in a stand-by position, the BK 420K is located at a preselected developing position where it faces the drum 414. On the start of a copying operation, the scanner 200 starts outputting BK image data at a preselected timing. The optical writing unit 401 starts scanning the charged surface of the drum 414 with a laser beam in accordance with the BK image data, thereby forming a latent image on the drum 414. Let this latent image be referred to as a BK latent image; this is also true with the other latent images. As soon as the leading edge of the BK latent image arrives at the developing position, the BK developing section 420K starts developing it with BK toner. When the trailing edge of the BK latent image moves away from the developing position, the revolver 420 is rotated to bring the next developing section to the developing position. This rotation is completed at least before the leading edge of the next latent image derived from the next image data arrives at the developing position.

On the start of the image forming operation, the drum 414 is rotated counterclockwise while the belt 415 is rotated clockwise, as indicated by an arrow in FIG. 1, by a motor not shown. A BK toner image, a C toner image, an M toner image and a Y toner image are sequentially formed on the drum 414 while being sequentially transferred to the belt 415 one above the other. As a result, a full-color image is completed on the belt 415.

More specifically, the belt 415 is passed over a drive roller 415D, a facing roller 415T for image transfer, a facing roller 415C for belt cleaning, and driven rollers. A motor, not shown, controllably drives the belt 415 via the drive roller 415D. A corona discharger 416 transfers the BK toner image from the drum 414 to the belt 415, which is moving in contact with and at the same speed as the drum 414. Let the transfer of a toner image from the drum 414 to the belt 415 be referred to as belt transfer hereinafter.

After the belt transfer of the BK toner image, the drum cleaning unit 421 removes some toner left on the drum 414 to thereby prepare the drum 414 for the next image forming cycle. The toner collected by the drum cleaning unit 421 is conveyed to a waste toner tank via a pipe, although not shown specifically. The BK, C, M and Y toner images are sequentially transferred from the drum 414 to the belt 415 one above the other. The resulting full-color toner image is transferred from the belt 415 to a sheet or recording medium by a corona discharger 417.

After the BK image forming cycle, the scanner 200 starts outputting C image data at a preselected timing. Consequently, a C latent image is formed on the drum 414 in accordance with the C image data in the same manner as the BK latent image. The revolver 420 is rotated after the trailing edge of the BK latent image has moved away from the developing position, but before the leading edge of the C latent image arrives at the developing position, locating the C developing section 420 at the developing position. The C developing section 420 then develops the C latent image.

As soon as the trailing edge of the C latent image moves away from the developing position, the revolver 420 is rotated to bring the M developing section to the developing position. This rotation is also effected before the leading edge of an M latent image arrives at the developing position. The image reading, latent image forming and developing procedure effected with M and Y are exactly the same as the procedure effected with BK and C except for color and will not be described specifically in order to avoid redundancy.

A belt cleaning device 415U includes an inlet seal, a rubber blade, an outlet coil, and a mechanism for moving the inlet seal and rubber blade, although not shown specifically. During the belt transfer of the toner images of the second to fourth colors, which follows the first color or BK, the above mechanism maintains the inlet seal and rubber blade spaced from the surface of the belt 415.

An AC-biased DC bias or a DC bias is applied to the corona discharger 417, so that the corona discharger 417 transfers the full-color image from the belt 415 to a sheet. This image transfer will be referred to as sheet transfer hereinafter. A sheet bank 482 accommodates a plurality of sheet cassettes each being loaded with a stack of sheets of particular size. When a sheet is paid out from designated one of the sheet cassettes, a feed roller pair 483 conveys the sheet toward a registration roller pair 418. A manual feed tray 412B is also available with the illustrative embodiment for allowing the operator to feed an OHP (OverHead Projector) film, a relatively thick sheet or similar special sheet by hand.

On the start of image formation, a sheet is fed from any one of the sheet trays to the registration roller pair 418 and temporarily stopped thereby. The registration roller pair 418 starts conveying the sheet such that the leading edge of the sheet meets the leading edge of the full-color toner image formed on the belt 415 at the Corona discharger 417. When the sheet moves above the corona discharger 417, which is connected to a positive potential, together with the toner image, the corona discharger 417 transfers the almost entire toner image from the belt 415 to the sheet. Subsequently, a discharge brush, not shown, positioned at the left-hand side of the corona discharger 417 discharges the sheet to thereby separate it from the belt 415. Thereafter, the sheet with the toner image is handed over to a belt conveyor 422.

The belt conveyor 422 conveys the sheet to a fixing unit 423. In the fixing unit 423, a heat roller 423A controlled to preselected temperature and a press roller 423B cooperate to fix the toner image on the sheet with heat and pressure. The sheet coming out of the fixing unit 423 is driven out to a copy tray, not shown, by an outlet roller pair 424 face up, i.e., with the image surface of the sheet facing upward.

After the belt transfer stated earlier, the drum cleaning unit 421 cleans the surface of the drum 414 with, e.g., a brush roller and a rubber blade. Subsequently, the quenching lamp 414 uniformly discharges the surface of the drum 414.

After the sheet transfer, the previously mentioned mechanism of the belt cleaning device 415U presses the inlet seal and rubber blade against the belt 415 for thereby cleaning the surface of the belt 415. In a repeat copy mode, the scanning and image forming procedure is executed with a second sheet at a preselected timing after the first sheet. More specifically, after the full-color toner image has been transferred from the belt 415 to the first sheet, a BK toner image meant for the second sheet is transferred from the drum 414 to the portion of the belt 415 cleaned by the belt cleaning device 415U.

While the above description has concentrated on a full-color mode, the illustrative embodiment repeats, in a tricolor or a bicolor mode, the procedure described above a number of times corresponding to desired colors and a desired number of copies. Further, in monocolor mode, the illustrative embodiment produces a desired number of copies while holding designated one of the developing sections of the revolver 420 at the developing position and holding the blade of the belt cleaning device 415U in contact with the belt 415.

Figure 3:
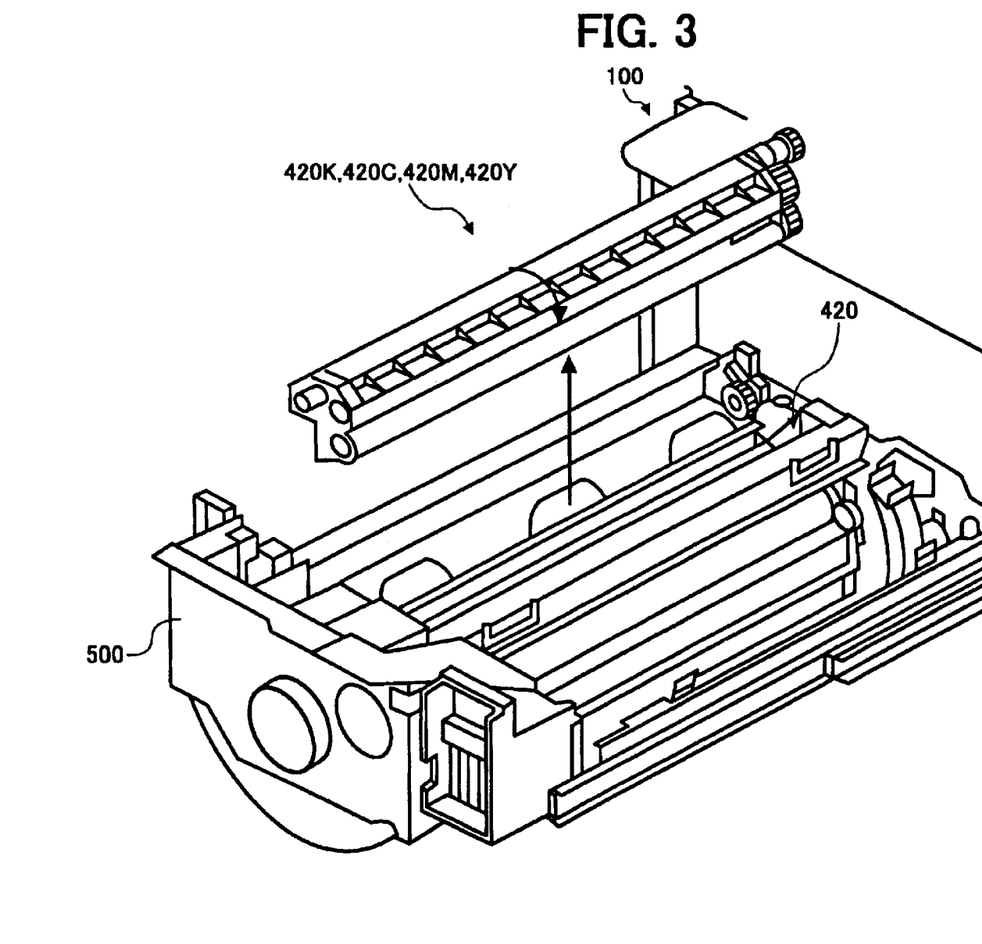
FIG. 3 is a perspective view showing the drawer unit pulled out of the image forming apparatus.

As shown in FIGS. 2 and 3, in the illustrative embodiment, the revolver 420 and drum 414 are mounted on a drawer unit 500 that can be pulled out of the body of the apparatus 100 toward the operator. As shown in FIG. 3, the BK developing section 420K through Y developing section 420Y each are constructed into a unit removable from the revolver 420. More specifically, the operator may remove the above unit upward by pulling out the drawer unit 500 and then removing screws fastening opposite ends of a developing roller, which will be described hereinafter.

Figure 4:
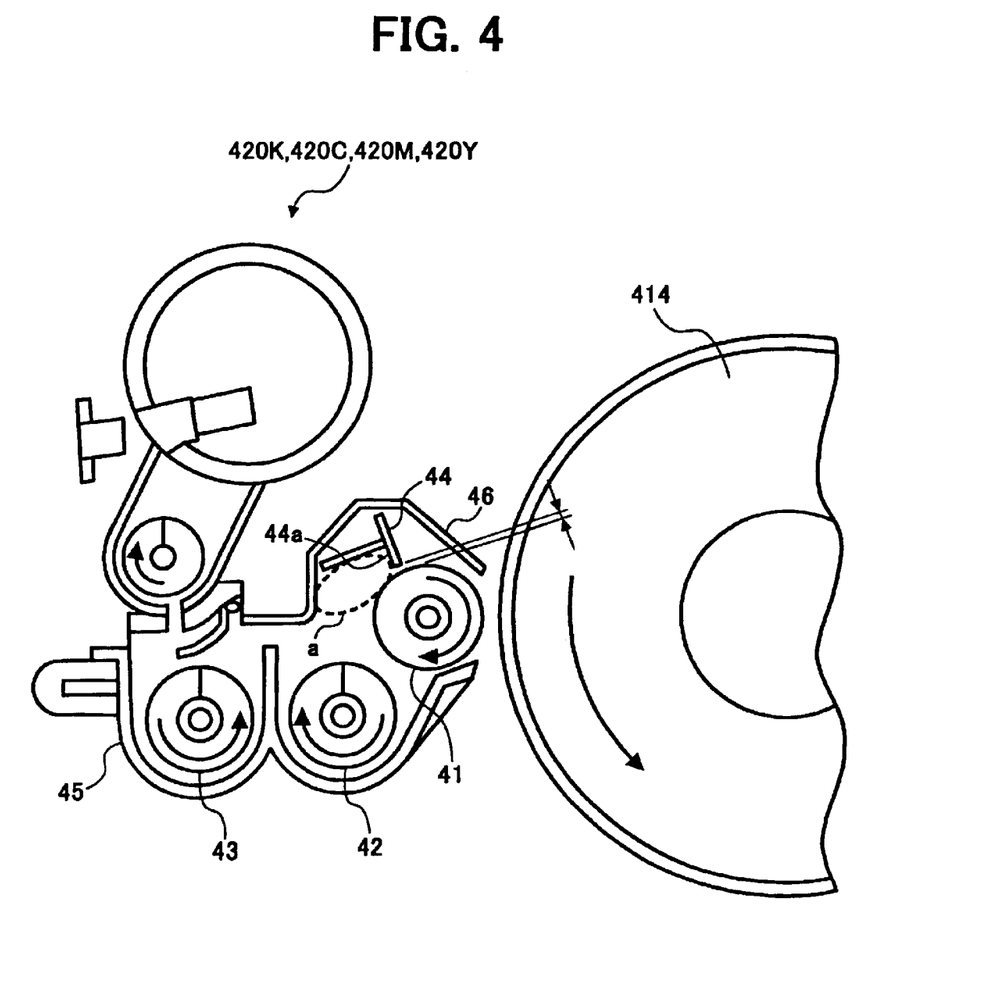
FIG. 4 is a view showing one of four developing sections arranged in a revolver type developing device included in the illustrative embodiment.
Figure 5:
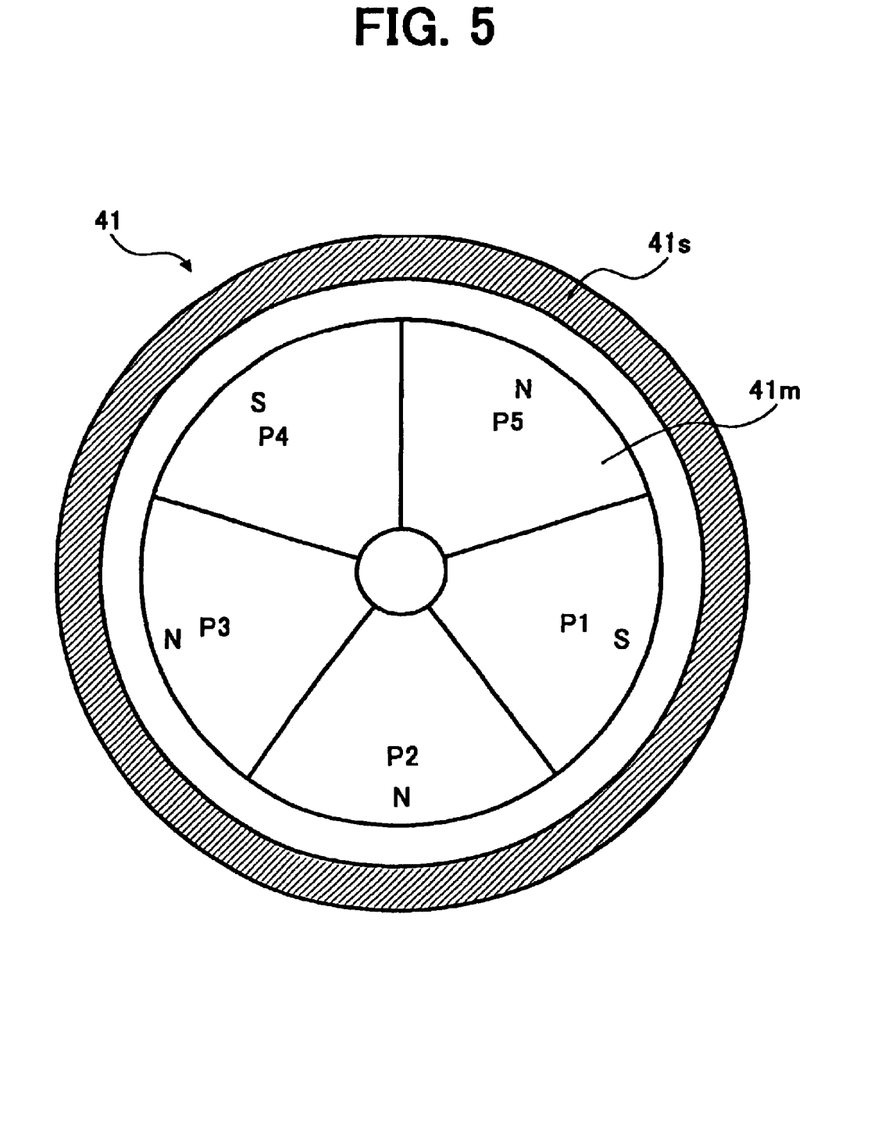
FIG. 5 is a section of a developing roller included in the developing device.

As shown in FIG. 4, the developing sections 420K through 420Y, which are identical in configuration, each include a developing roller or developer carrier 41, screws 42 and 43, a doctor or metering member 44, a casing 45, and a cover 46. As shown in FIG. 5, the developing roller 41 is made up of a cylindrical sleeve 41s and a magnet roller or magnetic field forming means 41m having magnetic poles P1 through P5. The magnet roller 41m is fixed in place inside the sleeve 41s.

When the sleeve 41s is rotated, a developer made up of toner grains and magnetic grains are retained on and conveyed by the surface of the sleeve 41s due to the magnetic poles of the magnet roller 41m. At this instant, as shown in FIG. 4, the doctor 44, which faces the sleeve 41s and is formed of a nonmagnetic material, and the magnetic pole of the magnet roller 41m facing the doctor 44 form a developer staying portion a at the upstream side in the direction of developer conveyance. In the developer staying portion a, the frictional charging of the developer is promoted. Further, a magnetic member 44a is positioned upstream and in the vicinity of the edge of the doctor 44 in the direction of developer conveyance. The magnetic member 44a serves to uniform the directivity of the magnetic force of the pole facing the doctor 44, thereby reducing irregularity in the amount of the developer being conveyed by the sleeve 41s.

To form a high-quality toner image on the drum 414 with the developing section having the above configuration, it is necessary to stabilize the amount of the developer scooped up onto the sleeve 41s (e.g. to be conveyed via a doctor gap Dg between the doctor 44 and the sleeve 41s), to reduce the deterioration of the developer, and to maintain the amount of charge to deposit on the toner adequate. The amount of the developer scooped up refers to the amount of the developer present on the portion of the sleeve 41s moved away from the doctor gap D1 for a unit area of 1 cm$^2$; this amount will be represented by p (g/cm$^2$) hereinafter.

It was experimentally found that the above conditions for high image quality were noticeably effected by the magnetic force distribution of the magnetic pole of the magnet roller 41m facing the edge of the doctor 44, as measured on the surface of the developing roller 41. More specifically, if the magnetic force of the above particular magnet is greater in the direction normal to the surface of the developing roller 41 than in the tangential direction, then the amount p of the developer noticeably fluctuates because the conveying force is critically influenced by the surface configuration of the sleeve 41s and that of the individual magnetic grain. In this case, the amount of the developer to deposit on the sleeve 41s increases and causes excessive friction to act between the grains of the developer. As a result, the deterioration of the developer generally referred to as toner spent occurs.

Conversely, assume that the magnetic force of the magnetic pole facing the doctor 44 is greater in the tangential direction than in the normal direction, as measured on the surface of the developing roller 41. Then, the developer conveying ability is improved and therefore reduces the fluctuation of the amount p of the developer ascribable to the surface configuration of the sleeve 41s and that of the individual grain. However, the amount of the developer that can be retained on the sleeve 41s is reduced with the result that the toner cannot be sufficiently charged by friction. This contaminates the background of an image and lowers the ability to follow a solid image.

The illustrative embodiment causes the edge of the doctor 44 to face a particular portion of the sleeve 41s in due consideration of the above-described influence of the magnetic force distribution of the magnetic pole facing the doctor 44 on image quality, as will be described hereinafter. Assume a normal flux density distribution range corresponding to, among the normal flux densities Bmy of normal magnetic forces that can be measured on the surface of the developing roller 41, a single maximum flux density max (Bmy). Then, in the illustrative embodiment, the edge of the doctor faces, within the above normal flux density distribution range, a portion of the developing roller 41 that satisfies the following conditions (1) through (3):

(1) the normal flux density Bmy is at least one-half of the normal maximum flux density max (Bmy);

(2) the above position lies in a tangential flux density distribution range having the maximum tangential flux density Bmx, which can be measured on the surface of the developing roller 41, located downstream of the portion of the developing roller surface where the tangential flux density Bmx is maximum in the direction of developer conveyance; and (3) the normal flux density distribution Bmy is equal to or higher than the tangential flux density Bmx.

It is to be noted that the maximum flux density max (Bmy) is the maximum value of the normal flux densities Bmy exerted by the particular magnetic pole and is generally $600 \times 10^{-4}$ T. If the above conditions (1) through (3) are satisfied, then it is possible to stabilize the amount p of the developer, reduce the deterioration of the developer, and make the amount of charge to deposit on the toner adequate.

Figure 6:
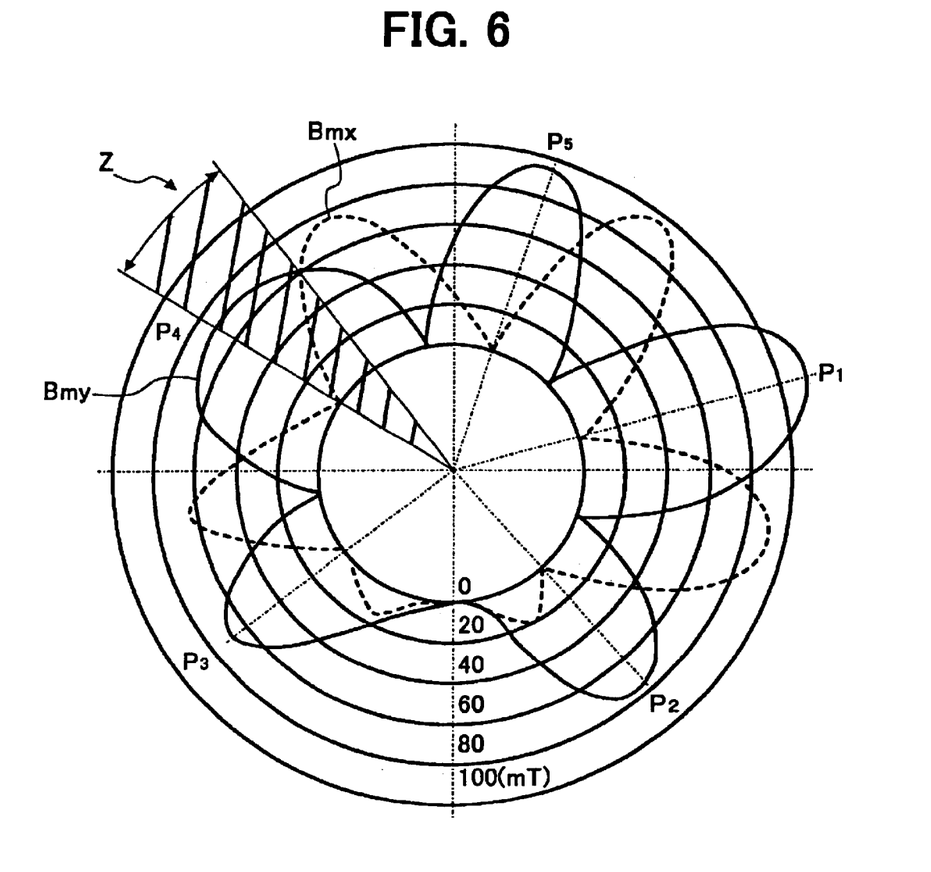
FIG. 6 is a chart showing the flux density distributions of the developing roller.

FIG. 6 shows a chart showing the normal flux density distributions (solid lines) and the tangential flux density distributions (phantom lines) generated by the magnetic poles of the developing roller 41. As shown, in the illustrative embodiment, the magnetic poles P1, P2, P4 and PS are S pole, N pole, N pole, S pole, and N pole although such an arrangement is only illustrative. The pole P4 forms normal flux densities extending toward the edge of the doctor 44 in the form of a single loop Bmy. Also, the tangential flux density distribution range having the maximum tangential flux density Bmx, which can be measured on the surface of the developing roller 41, located downstream of the portion of the developing roller surface where the tangential flux density Bmx is maximum in the direction of developer conveyance corresponds to a single loop Bmx.

In the illustrative embodiment, as the chart of FIG. 6 indicates, the maximum flux density max (Bmy) in the normal direction is substantially $700 \times 10^{-4}$ T. Therefore, the flux density range in the normal direction that satisfies the condition (1) is higher than $350 \times 10^{-4}$ T inclusive. So long as the flux density in the normal direction is higher than $300 \times 10^{-4}$ T inclusive, it is possible to maintain the restraining force for restraining the developer on the developing roller 41 at the metering position of the doctor 44 for thereby maintaining the amount p of the developer constant.

In FIG. 6, a zone Z indicated by hatching satisfies all of the three conditions (1) through (3). However, the boundary where the flux density Bmx in the tangential direction coincides with the max(Bmy) of the pole P4 is zero and therefore excluded. The other boundary where Bmy=Bmx holds is included because it satisfies the conditions (1) through (3).

The magnetic member 44a adjoining the edge of the doctor 44 exerts a magnetic restraining force that causes the magnetic grains of the developer to chain in the form of a curtain in the doctor gap D1. The curtain further frictionally changes the toner grains passing therethrough due to contact with the magnetic grains, thereby depositing sufficient charge on the toner grains.

However, if the magnetic restraining force of the magnetic member 44a is excessive, then excessive stress acts on the magnetic grains and sleeve 41s and causes fine undulations thereof to wear out. This reduces the frictional resistance of the surface of the sleeve 41s and that of the surfaces of the magnetic grains and thereby causes the magnetic grains to slip on the sleeve 41s. Consequently, the conveying ability of the sleeve 41s is noticeably lowered, marking an image granular or making halftone irregular. Conversely, if the magnetic restraint of the magnetic member 44a is short, then the magnetic grains fail to form the curtain.

Figure 7:
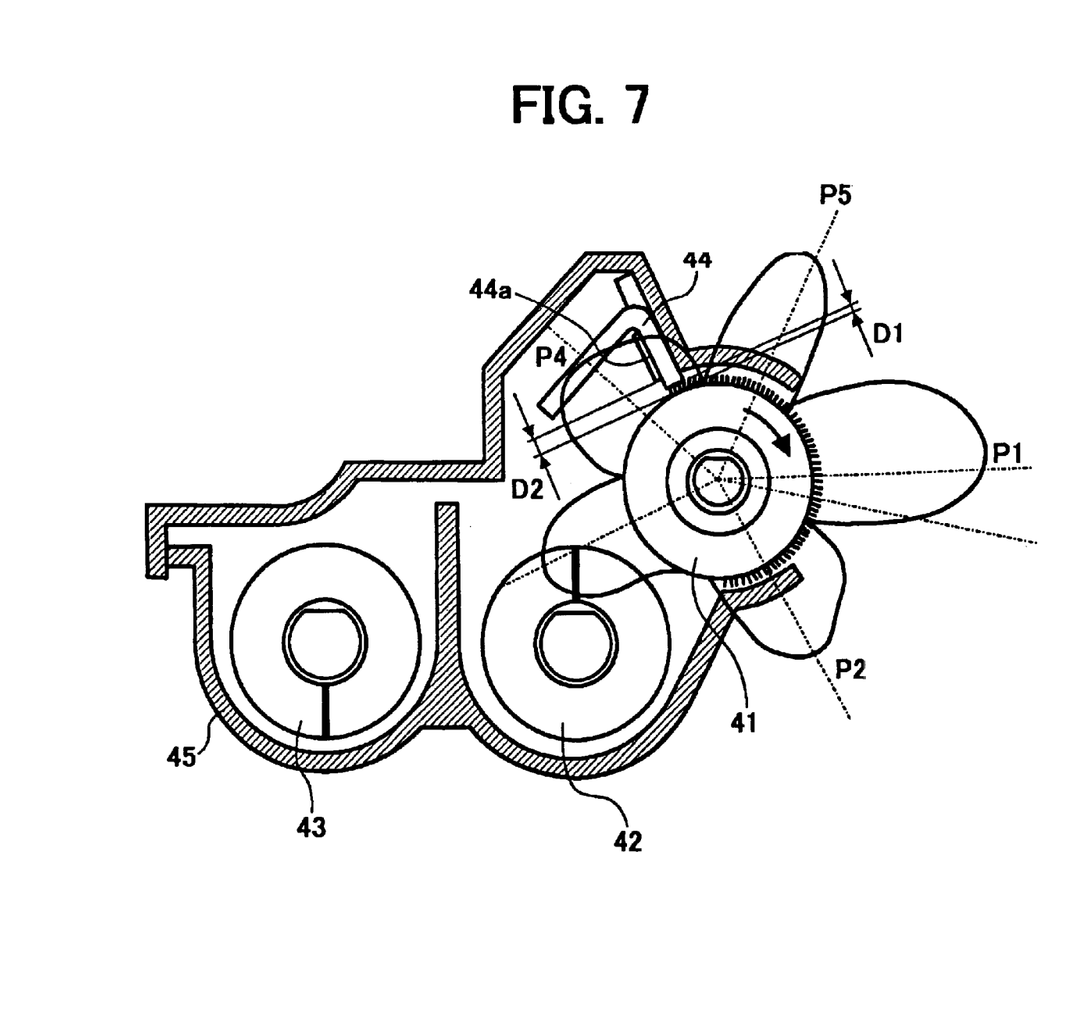
FIG. 7 is a view for describing the developing device.

In light of the above, the illustrative embodiment defines the position of the magnetic member 44a specifically. As shown in FIG. 7, in the revolver 420, the doctor 44 located at a position where the normal flux density in the zone Z. FIG. 6, is $600 \times 10^{-4}$ T. The magnetic member 44a is provided with thickness of 0.5 mm and affixed to the upstream face of the doctor 44 in the direction in which the sleeve 41s conveys the developer. Assume that the distance between the surface of the sleeve 41s and the edge of the doctor 44 is D1, and that the distance between the surface of the sleeve 41s and the magnetic member 44a is D2. Then, the magnetic member 44a is so positioned as to satisfy a relation:

$$0.3 \leq D2-D1 \leq 1.0$$

In the above condition, the distance between the edge of the doctor 44 and that of the magnetic member 44a lies in the range of from 0.3 mm to 1.0 mm.

Figure 8:
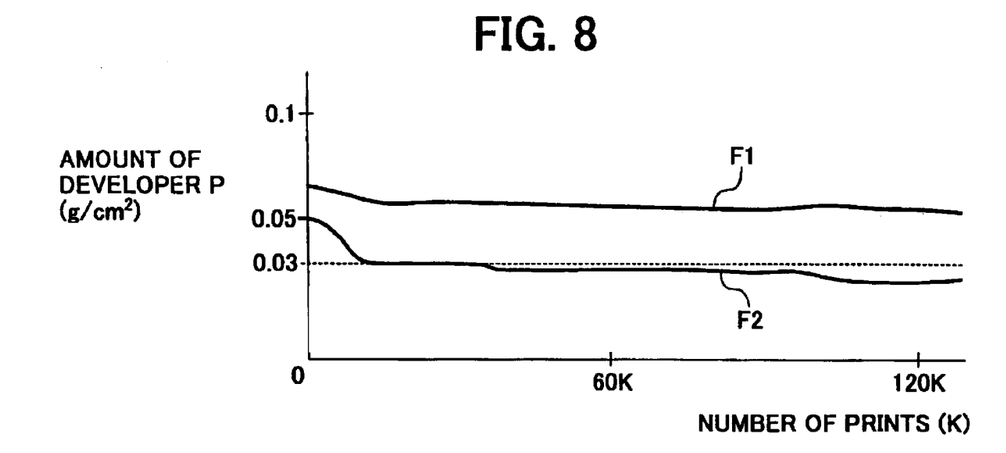
FIG. 8 is a graph showing a relation between the amount of a developer scooped up and the number of prints output.

FIG. 8 shows curves F1 and F2 each showing a relation between the amount ρ of the development and the number of prints output in a particular condition. Specifically, the curve F1 holds when the distance f=D2−D1 lies in the above range of from 0.3 mm to 1.0 mm while the curve F2 holds when the distance f is zero, i.e., when the edge of the doctor 44 and that of the magnetic member 4a are flush with each other. The data shown in FIG. 8 were obtained by maintaining the distance D1 constant. As shown, when the distance f is zero, the amount ρ starts decreasing around 1,000 prints and then decreases below 0.03 at which an image becomes granular. By contrast, when the distance f is between 0.3 mm and 1.0 mm, the amount ρ stably remains above 0.05 even when more than 10,000 prints are output.

When the distance f is smaller than 0.3 mm, but greater than 0 mm, the amount ρ is smaller than F1, but greater than F2, although not shown specifically. This is because the distance f smaller than 0.3 mm intensifies the restraint of the magnetic member 44 on the carrier and thereby critically lowers the conveying ability due to a decrease in frictional resistance. The decrease in frictional resistance is ascribable to the wear of the surfaces of the carrier grains and toner filming on the surface of the sleeve 41s.

On the other hand, when the distance f is greater than 1.0 mm, the distance from the surface of the sleeve 41s increases although the amount ρ is the same as when the distance f is between 0.3 mm and 1.0 mm. As a result, while the magnetic restraint of the magnetic field forming means decreases in inverse proportion to the square of the distance, the magnetic member 44a fails to desirably form the curtain of the magnetic grains when the distance f exceeds 1.0 mm. Consequently, the magnetic member 44a cannot promote the frictional charging of the toner.

In the illustrative embodiment, use is made of magnetic grains having a grain size of 50 μm or below each, which is contrastive to the conventional grain size of around 65 μm. The grain size of 50 m or below effectively enhances image quality. When the grain size is 50 μm or above for a halftone dot image whose color value is between 70 and 90, granularity is about 0.3. However, when the grain size is lowered to about 35 μm for such an image, granularity is reduced to 0.1, meaning that dot reproducibility is almost tripled.

Figure 9:
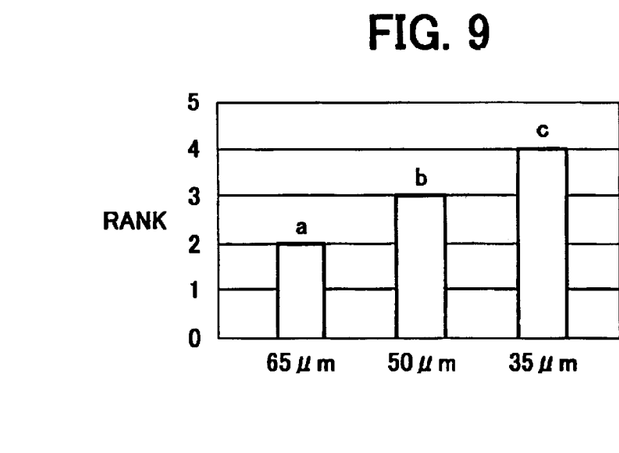
FIG. 9 is a graph showing granularity ranks based on the grain size of magnetic grains.

FIG. 9 compares the grain sizes of 35 μm, 50 μm and 65 μm of the magnetic grains as to the granularity of an image by using ranks 0 to 5; the higher the rank, the higher the dot reproducibility. As shown, a (grain size of 65 μm), b (grain size of 50 μm) and c (grain size of 35 μm) belong to ranks 2, 3 and 4, respectively. This indicates that higher dot reproducibility is achievable with smaller grain size.

In summary, it will be seen that the present invention provides a developing device and an image forming apparatus using the same capable of stabilizing the amount of a developer to be scooped up, protecting the developer from deterioration, and making the amount of charge to deposit on the developer adequate, thereby insuring stable image quality. Further, an adequate amount of desirably charged developer insures high-quality image formation in cooperation with high dot reproducibility.

Various modifications will become possible for those skilled in the art after receiving the teachings of the present disclosure without departing from the scope thereof.

What is claimed is:

1. A developing device comprising:

a developer carrier for conveying a developer, which comprises toner and magnetic grains, deposited thereon to a developing position where said developer carrier faces an image carrier;

magnetic field forming structure fixed in place inside said developer carrier for exerting a normal magnetic force and a tangential magnetic force; and a metering member facing a surface of said developer carrier, but spaced from said surface by a gap, for regulating an amount of the developer being conveyed by said developer carrier toward the developing position;

wherein assuming a normal flux density distribution range corresponding to, among normal flux densities Bmy of normal magnetic forces that can be measured on the surface of said developer carrier, a single maximum flux density distribution range, a portion of said developer carrier that satisfies the following conditions (1) through (3):

(1) a normal flux density Bmy is at least one-half of the maximum normal flux density max (Bmy);

(2) a tangential flux density distribution range of tangential magnetic forces has a maximum tangential flux density Bmx, which can be measured on the surface of said developer carrier, located downstream of a portion of said developer carrier where the tangential flux density Bmx is maximum in a direction of developer conveyance; and (3) the normal flux density distribution Bmy is equal to or higher than the tangential flux density Bmx.

2. The developing device as claimed in claim 1, wherein the magnetic grains have grain size of 50 μm each or below.

3. The developing device as claimed in claim 1, wherein said metering member comprises a nonmagnetic metering member and provided with a magnetic member on an upstream face thereof in the direction of developer conveyance, and assuming that a distance between the surface of the developer carrier and the edge of the metering member is D1, and that a distance between said surface of said developer carrier and said magnetic member is D2, then the magnetic member is positioned to satisfy a relation:

0.3 mm ≦ D2−D1 ≦ 1.0 mm.

4. The developing device as claimed in claim 3, wherein the magnetic grains have a grain size of 50 μm each or below.

5. An image forming apparatus comprising:

an image carrier;

latent image forming means for forming a latent image on a surface of said image carrier;

developing means for developing the latent image to thereby produce a corresponding toner image; and image transferring means for transferring the toner from said image carrier to a recording medium;

said developing device comprising:

a developer carrier for conveying a developer, which comprises toner and magnetic grains, deposited thereon to a developing position where said developer carrier faces said image carrier;

magnetic field forming means fixed in place inside said developer carrier for exerting a normal magnetic force and a tangential magnetic force; and a metering member facing a surface of said developer carrier, but spaced from said surface by a gap, for regulating an amount of the developer being conveyed by said developer carrier toward the developing position;

wherein assuming a normal flux density distribution range corresponding to, among normal flux densities Bmy of normal magnetic forces that can be measured on the surface of said developer carrier, a single maximum flux density max (Bmy), then said metering member is positioned such that an edge of said metering member faces, within said normal flux density distribution range, a portion of said developer carrier that satisfies the following conditions (1) through (3):

(1) a normal flux density Bmy is at least one-half of the maximum normal flux density max (Bmy);

(2) a tangential flux density distribution range of tangential magnetic forces has a maximum tangential flux density Bmx, which can be measured on the surface of said developer carrier, located downstream of a portion of said developer carrier where the tangential flux density Bmx is maximum in a direction of developer conveyance; and (3) the normal flux density distribution Bmy is equal to or higher than the tangential flux density Bmx. such that an edge of said metering member faces, within said normal flux density distribution range, a portion of said developer carrier that satisfies following conditions (1) through (3):

(1) a normal flux density Bmy is one-half of the maximum flux density max(Bmy);

(2) a tangential flux density distribution range of tangential magnetic forces has a maximum tangential flux density Bmx, which can be measured on the surface of said developer carrier, located downstream of a portion of said developer carrier where the tangential flux density Bmy is maximum in a direction of developer conveyance; and (3) the normal flux density distribution Bmy is higher than the tangential flux density Bmx.

* * * * *